US007581022B1

(12) United States Patent
Griffin et al.

(10) Patent No.: US 7,581,022 B1
(45) Date of Patent: Aug. 25, 2009

(54) METHOD FOR TUNABLE INTER DOMAIN EGRESS SELECTION

(75) Inventors: Timothy Griffin, Cambridge (GB);
Mauricio Resende, Holmdel, NJ (US);
Jennifer Rexford, Jersey City, NJ (US);
Renata Teixeira, Paris (FR)

(73) Assignee: AT&T Corp., New York, NY (US)

( * ) Notice: Subject to any disclaimer, the term of this patent is extended or adjusted under 35 U.S.C. 154(b) by 706 days.

(21) Appl. No.: 11/275,408

(22) Filed: Dec. 29, 2005

(51) Int. Cl.
*G06F 15/173* (2006.01)
(52) U.S. Cl. .................. 709/238; 709/241; 370/238; 370/329
(58) Field of Classification Search .......... 709/238, 709/241
See application file for complete search history.

(56) References Cited

U.S. PATENT DOCUMENTS

| | | | | |
|---|---|---|---|---|
| 6,661,797 | B1 * | 12/2003 | Goel et al. ............. | 370/395.21 |
| 6,785,737 | B2 * | 8/2004 | Lee et al. .................... | 709/241 |
| 6,882,643 | B1 * | 4/2005 | Mauger et al. .............. | 370/389 |
| 7,353,294 | B1 * | 4/2008 | Nucci et al. ................. | 709/241 |
| 2006/0153206 | A1 * | 7/2006 | Erwin et al. ................ | 370/401 |

OTHER PUBLICATIONS

Griffin, T. G., "Design Principles of Policy Languages for Path Vector Protocols", *Proc Of SIGCOMM '03*, Aug. 25-29, 2003, Karlsruhe, Germany, pp. 61-72.

Rekhter, Y. et al., "A Border Gateway Protocol", *The Internet Society*, Oct. 2004, pp. 1-120.

Teixeira, R., et al., "Traffic Matrix Reloaded: Impact of Routing Changes", *Proc. Of Passive and Active Measurement*, Mar./Apr. 2004.

Renata Teixeira, et al., "Network Sensitivity to Hot-Potato Disruptions," Sigcomm'04, Aug. 30-Sep. 3, 2004, 14 pages.

Renata Teixeira, et al., "Dynamics of Hot-Potato Routing in Ip Networks," Sigmetrics/Performance '04, Jun. 12-16, 2004, 12 pages.

Thomas C. Bressoud, et al, "Optimal Configuration for BGP Route Selection," IEEE Infocom 2003,11 pages.

* cited by examiner

*Primary Examiner*—Firmin Backer
*Assistant Examiner*—Natisha Cox
(74) *Attorney, Agent, or Firm*—Banner & Witcoff, Ltd.

(57) ABSTRACT

A flexible mechanism and method for routers to select the egress point for each destination comprises identifying a plurality of points of egress from an autonomous system, ranking the plurality of points of egress according to a metric having variable and fixed terms, selecting a point of egress having the smallest rank, and transmitting packets from a point of ingress via a path to the selected point of egress. The metric is across a plurality of destinations and respective possible points of egress from the autonomous system and the metric is $m(i, p, e)$ equaling $\alpha(i, p, e) \cdot d(G,i,e) + \beta(i, p, e)$ where a and $\beta$ are configurable values, i is the identity of the router, p is the destination, G is an undirected weighted graph, the d function is the interior gateway protocol distance and e is a point of egress.

11 Claims, 7 Drawing Sheets

Link failure causes router C to switch egress points from A to B

Fig. 1. Link failure causes router C to switch egress points from A to B

Fig. 2. Example illustrating heterogeneous traffic types.

Fig. 3. Example illustrating constraints on values of a and R.

1) Identify the closest egress point in the original graph: $b = \text{argmin}_e \{d(G, i, e) \mid e \in E(p)\}$.
2) For each $e \in E(p) \setminus \{b\}$, generate the constraint "$a(i,p,b) \cdot d(G,i,b) + (\beta(i,p,b) < a(i,p,e) \cdot d(G,i,e) + \beta(i,p,e)$"
3) For each $\delta \in \Delta G$
   a) Identify the preferred egress point $b'$: If $d(\delta(G), i, b) \leq T \cdot d(G, i, b)$, then $b' = b$. Else, $b' = \text{argmin}_e \{d(\delta(G), i, e) \mid e \in E(p)\}$.
   b) For each $e \in E(p) \setminus \{b'\}$, generate the constraint "$a(i, p, b') \cdot d(\delta(G), i, b') + (\beta(i, p, b') < a(i, p, e) \cdot d(\delta(G), i, e) + \beta(i, p, e)$"

Fig. 4. Algorithm of the simulation phase.

Fig. 5. Comparison of egress-selection schemes on the Abilene network under single-node failures with TIE optimized for single-link failures and $T=2$.

Fig. 6. Comparison of egress-selection schemes on the ISP network under single-node failures for TIE optimized for single-link failures and $T=3$.

Fig. 7. Piecewise-linear penalty function +(u($)) versus link utilization

Fig. 8. Comparison of link utilization with hot-potato routing and TIE.

METHOD FOR TUNABLE INTER DOMAIN EGRESS SELECTION

BACKGROUND OF THE INVENTION

The invention relates to the field of data transmission protocols and, more particularly, to the field of selecting an efficient point of egress from a data network by ranking possible points of egress according to principles of tunable inter-domain egress (TIE) as further explained herein.

The Internet's two-tiered routing architecture was designed to have a clean separation between intra-domain and inter-domain routing protocols. For example, an inter-domain protocol allows the border routers to learn how to reach external destinations, whereas the intra-domain protocol determines how to direct traffic from one router in an autonomous system (AS) to another router. However, the appropriate roles of the two protocols becomes unclear when the autonomous system learns routes to a destination at multiple border routers—a situation that arises quite often today. An autonomous system as defined by Newton's Telecom Dictionary is a collection of routers under a single administrative authority using a common Interior Gateway Protocol for routing packets. By intra-domain and inter-domain protocol is meant the respective reach of a protocol as either within the autonomous system or domain or reaching beyond the autonomous system to include other autonomous systems or domains. Since service providers peer at multiple locations, essentially all of the traffic from customers to the rest of the Internet has multiple possible egress routers. In addition, many customers connect to their provider in multiple locations for fault tolerance purposes and for more flexible load balancing, resulting in multiple egress routers for these destinations as well. Selecting among multiple possible egress points is now a fundamental part of the Internet routing architecture, independent of the current set of routing protocols.

In the Internet today, for example, per Bressoud et al., "Optimal Configuration for BGP Route Selection," IEEE, 2003; Rekhter et al., "A Border Gateway Protocol," September, 2004 and subsequent related publications, border routers learn routes to destination prefixes via a known Border Gateway Protocol (BGP). When multiple border routers have routes that are "equally good" in the BGP sense (e.g., local preference, path length within the autonomous system, etc.), each router in the autonomous system may direct traffic to the closest border router, in terms of Interior Gateway Protocol (IGP) distances. This policy of early-exit or so-called "hot-potato" routing is hard-coded in the BGP decision process implemented on each router.

Hot-potato routing allows a router to implement a simple decision rule, independently of the other routers, while ensuring that packets are forwarded to neighboring routers that have selected the same (closest) egress point. In addition, hot-potato routing tends to limit the consumption of bandwidth resources in the network by shuttling traffic to the next autonomous system as early as possible.

The decision to select egress points based on IGP distances may be inappropriate in light of the growing pressure to provide good, predictable communication performance for applications such as voice-over-IP, on-line gaming, and business transactions. Hot-potato routing may be unnecessarily restrictive. The underlying mechanism of hot-potato routing dictates a particular policy rather than supporting diverse performance objectives important to network administrators. Moreover, "hot potato" routing tends to be disruptive. Small changes in IGP distances can sometimes lead to large shifts in traffic, long convergence delays, and BGP updates to neighboring domains. Network administrators are forced to select IGP metrics that make "BGP sense," rather than viewing the two parts of the routing system separately.

Selecting an egress point and computing a forwarding path to the egress point are two very distinct functions, and decoupling these functions may be appropriate. Paths inside the network should be selected based on some meaningful performance objective, whereas the egress selection may be flexible to support a broader set of traffic-engineering goals.

The Internet routing system has three main components: (i) inter-domain routing, which determines the set of border (or egress) routers that direct traffic toward a destination, (ii) intra-domain routing, which determines the path from an ingress router to an egress router, and (iii) egress-point selection, which determines which egress router is chosen by each ingress router for each destination. Tying egress selection to IGP distances may lead to harmful disruptions and over-constrained traffic-engineering problems. Also, allowing each ingress router to have a fixed ranking of egress points may not be flexible enough (for traffic engineering) or adaptive enough (to large changes in the network topology).

Figure 1:
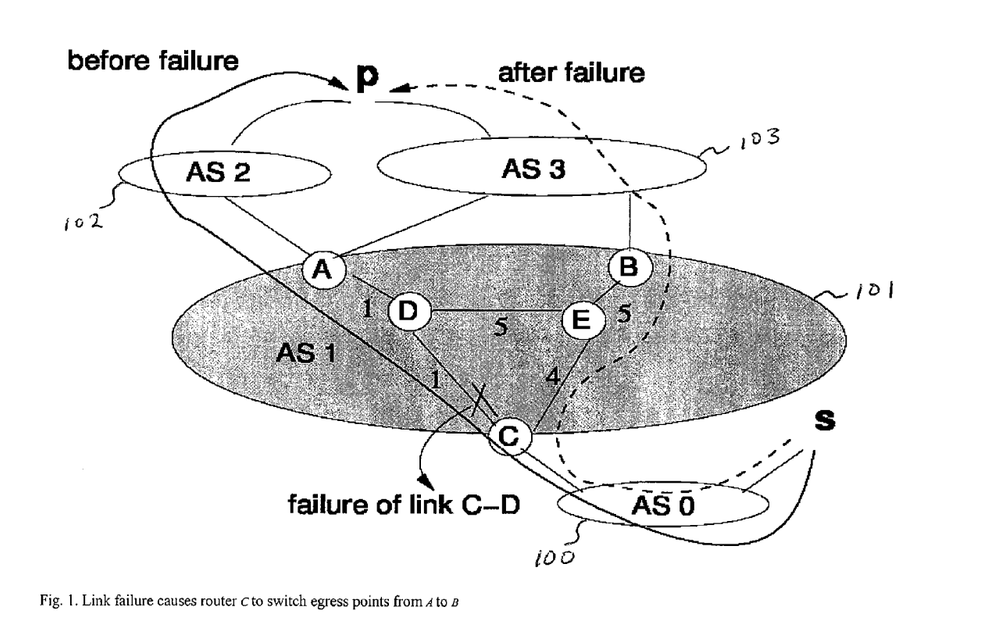
FIG. 1 illustrates a typical end to end connection from source to destination through a plurality of autonomous systems wherein, for example, a link failure causes router C to switch egress points from A to B.

An exemplary network is shown in FIG. 1 comprising autonomous systems AS 0, 1, 2 and 3 where a source S is transmitting toward a destination p via AS 0. Autonomous system AS 1 101 is shown having five routers (A, B, C, D, and E) by way of example and each internal link has an IGP metric shown. Router C learns BGP routes to destination p from possible egress routers A and B.

Under hot-potato routing, point of ingress router C into AS 1 chooses the BGP route learned from A because the IGP distance to A is 1+1 or 2, which is smaller than the distance of 9 to B. However, if the C-D link fails (indicated by the X break), all traffic from ingress C to destination p would shift to egress router B, with an IGP distance of 9 that is smaller than the IGP distance of 10 to alternative egress router A. These kinds of routing changes are disruptive. Yet, continuing to use egress-point A might not be the right thing to do, either, depending on the propagation delay, traffic demands, and link capacities. Instead, network administrators need a mechanism that is flexible enough to support sound performance trade-offs.

Hot-potato routing has the advantage of adapting automatically to topology changes that affect the relative distances to the egress points. Although hot-potato routing is a reasonable way to minimize resource consumption, IGP link weights do not express resource usage directly. The IGP distances do not necessarily have any relationship to hop count, propagation delay, or link capacity, and selecting the closer egress point does not necessarily improve network performance. In addition, small topology changes can lead to performance disruptions, for example, large shifts in traffic within and between autonomous systems. A single link failure can potentially impact the egress-point selection for tens of thousands of destinations at the same time, leading to large shifts in traffic. In fact, hot-potato routing changes may be responsible for many of the largest traffic variations in a large backbone.

Another type of performance disruption is changes in the downstream path. When the egress point changes, the traffic moves to a different downstream forwarding path that may have a different round-trip time or available bandwidth, which may disrupt the communicating applications. In addition, the abrupt increase in traffic entering the neighboring AS may cause congestion.

Yet another performance disruption is the need for BGP update messages for neighboring domains. A change in egress point may also change the AS path. The failure of the C-D link in FIG. 1 causes router C to switch from a path through AS 2 to one through AS 3, forcing C to send a BGP update message to source autonomous system AS 0. Global BGP convergence may take several minutes. If AS 0 switches to a BGP route announced by another provider, the traffic entering AS 1 at router C would change.

Even if the hot-potato routing change does not lead to new BGP update messages, long convergence delays can occur inside the autonomous system depending on how the router implements the BGP decision process. Long convergence delays may occur because the underlying routers in the network only revisited the influence of IGP distances on BGP decisions once per minute; during the convergence period, data packets may be lost, delayed, or delivered out of order.

In a large network, IGP changes that affect multiple destination prefixes happen several times a day, sometimes leading to very large shifts in traffic. Not all of these events are caused by unexpected equipment failures—a large fraction of them are caused by planned events, such as routine maintenance performed by service personnel. Maintenance activities may happen quite frequently, for example, to upgrade operating systems on routers, replace line cards or repair optical amplifiers, or construction activities may require moving fibers or disabling certain links temporarily. A recent study of the Sprint backbone showed that almost half of IGP events happened during maintenance windows.

Often, shifts in egress points are not necessary. The new intra-domain path to the old egress point, although a little longer IGP-wise, may offer comparable (or even better) performance than the path to the new egress point. Following the failure of the C-D link in FIG. 1, the path C,E,D,A might be less congested or have lower propagation delay than the path C, E, B. Moreover, many internal network changes are short-lived; a study of the Sprint backbone showed that 96% of failures were repaired in less than 15 minutes. Maintenance activities are often done in periods of lower traffic demands, when the network would comfortably have extra capacity to tolerate the temporary use of non-closest egress points.

Besides being disruptive, the tight coupling between egress selection and IGP metrics makes traffic engineering and maintenance planning extremely difficult. Network administrators indirectly control the flow of traffic by tuning the IGP metrics and BGP policies. However, finding good settings that result in the desired behavior is computationally challenging, due to the large search space and the need to model the effects on egress-point selection. Finding settings that are robust to a range of possible equipment failures is even more difficult, imposing even more constraints, such as minimizing hot-potato disruptions across all routers and destination prefixes and making the problem increasingly untenable. In addition, once local-search techniques identify a better setting of the IGP metrics or BGP policies, changing these parameters in the routers requires the network to go through routing-protocol convergence, leading to transient performance disruptions.

Another alternative is to configure each router with a fixed ranking of the egress points, where the router would select the highest-ranked element in the set of egress routers for each destination. This solution may be realizable using today's technology. According to a principle of the present invention, a fixed ranking method would include the step of establishing a tunnel from each ingress router to each egress router, and assigning an IGP metric to the tunnel. By a "tunnel" is intended the establishment of a packet communication between one router and another router without the packet communication's passing through intermediate routers. The data packets would follow the shortest underlying IGP path from the ingress router to the chosen egress router. The hot-potato mechanism may still be used to dictate the selection of egress points, but the metric associated with each tunnel would be defined statically at configuration time rather than be automatically computed by the IGP. Thus, network administrators may rank the egress points from each router's perspective, allowing each ingress router to select the highest-ranked egress point independent of internal network events, short of the extreme case where the egress point becomes unreachable and the router is forced to switch to the egress point with the next highest rank.

For the example in FIG. 1, router C could be preconfigured to prefer egress A over B. Then, when the C-D link fails, C would continue to direct traffic toward router A, though now using the path C,E,D,A. This would avoid triggering the traffic shift to B, changes in the downstream forwarding path, and BGP updates to neighboring domains. However, although the fixed ranking is extremely robust to internal changes, sometimes switching to a different egress point is a good idea. For example, the path C,E,D,A may have limited bandwidth or a long propagation delay, making it more attractive to switch to egress-point B, even at the expense of causing a transient disruption. In the long term, network administrators could conceivably change the configuration of the ranking to force the traffic to move to a new egress point, but the reaction would not be immediate. Similarly, the administrators could reconfigure the IGP metrics or BGP policies to redistribute the traffic load, at the expense of searching for a suitable solution, reconfiguring the routers, and waiting for the routing protocol to converge.

Hot potato and fixed ranking mechanisms for selecting egress points represent two extremes in trade-off between robustness and automatic adaptation. Hot-potato routing adapts immediately to internal routing changes (however small), leading to frequent disruptions. Imposing a fixed ranking of egress points, while robust to topology changes, cannot adapt in real time to critical events. Neither mechanism offers sufficient control for network administrators trying to engineer the flow of traffic and plan for maintenance.

SUMMARY OF THE INVENTION

Thus there is required an improved solution to the problems of hot potato routing and other known route selection schemes. Fixed ranking is proposed as an alternative according to the present invention to hot potato routing but fixed ranking is not adaptive. The problem, while serious, can be addressed by having routers use an event-driven implementation that immediately revisits the BGP routing decisions after a change in the intra-domain topology.

In a preferred embodiment of the present invention, candidate egress points are compared based on a weighted sum of the IGP distance and a constant term. The configurable weights provide flexibility in deciding whether (and how much) to base BGP decisions on the IGP metrics. Network management systems may apply optimization techniques to automatically set these weights to satisfy network-level objectives, such as load balancing objectives and the minimization of propagation delays. To ensure consistent forwarding through the network, lightweight tunnels are used to direct traffic from the ingress router to the chosen egress point. The new preferred method, according to the present invention, will be referred to herein as TIE (Tunable Inter-domain Egress) because it controls how routers break ties between multiple equally-good BGP routes. TIE is both simple (for the routers) and expressive (for network administrators). No new protocols or any changes to today's routing protocols are introduced with TIE, making it possible to deploy at one autonomous system at a time and with only minimal changes to the BGP decision logic on IP routers. Thus, one aspect of the present invention is to provide a mechanism for egress-point selection that is flexible enough to control the flow of traffic in steady state, while responding automatically to network events that would degrade performance.

In accordance with one aspect of the present invention, TIE provides a flexible mechanism for egress-point selection. In particular, the TIE mechanism is: (i) flexible in balancing the trade-off between sensitivity to IGP changes and adaptability to network events, (ii) computationally easy for the routers to execute in real time, and (iii) easy for a higher-level management system to optimize based on diverse network objectives.

In accordance with another aspect of TIE, network-wide objectives may be met. Exemplary problems are suggested and are solved easily using TIE. First, sensitivity to internal topology changes is minimized, subject to a bound on propagation delay, using integer programming to tune the weights in the TIE mechanism. Second, load is balanced in the network without changing the IGP metrics or BGP policies, by using multi-commodity-flow techniques to move some traffic to different egress points than would be selected using prior art techniques.

In particular, TIE has been evaluated on two backbone networks, Abilene and a large tier-1 ISP, using traffic, topology and routing data from these two backbone networks. Results indicate that TIE reduces sensitivity to internal topology changes while satisfying network-wide objectives for load and delay.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3(a) shows an autonomous system having two points of egress toward destination p and (b) illustrates constraints on values of A and destination p.

FIGS. 6(a) and (b) respectively illustrate propagation delay ratio (CCDF) and routing sensitivity (CCDF) for a comparison of egress-selection schemes on the ISP network under single-node failures for TIE optimized for single-link failures and T=3.

DETAILED DESCRIPTION OF THE INVENTION

According to the present invention, a tunable inter-domain egress (TIE) mechanism selects an egress point of a plurality of possible egress points for each ingress router and destination prefix in a network. Ideally, an optimization routine could compute the egress points directly based on the current topology, egress sets and traffic, subject to a network-wide performance objective. However, the routers must adapt in real time to events such as changes in the underlying topology and egress sets. The TIE mechanism allows a separation of timescales—enabling both rapid adaptation to unforeseen events and longer-term optimization of network-wide objectives than hot potato, fixed ranking or other routing schemes. In addition, the design of the TIE mechanism places an emphasis on generality to support a wide variety of network objectives, rather than tailoring to one particular scenario.

The TIE mechanism allows each router to have a ranking of the egress points for each destination prefix p. That is, router i has a metric m(i, p, e), across all destination prefixes p and egress points e. For each prefix p, the router considers the set of possible egress points e and selects the one with the smallest rank, and then forwards packets over the shortest path through the network to that egress point. TIE differs from the prior art in several key ways. First, the TIE ranking metric has finer granularity, permitting an ingress router to have a different ranking for different destination prefixes. Second, our ranking metric is computed rather than statically configured, allowing the ranking to adapt to changes in the network topology and egress set. Third, our metric is not tied directly to the underlying tunnel that directs traffic from an ingress point to the chosen egress point e, achieving finer granularity of control without increasing the number of tunnels. TIE is more flexible than tuning BGP routing policies, in that one router can start using a new egress point e while other routers continue to use the old one.

TABLE 1

SUMMARY OF NOTATION

| | |
|---|---|
| Undirected graph | G = {N,L), nodes N and links L |
| Ingress and egress nodes | i ∈ N and e ∈ N |
| IGP distance on graph | d{G,i,e), i,e∈N |
| Destination prefix | p∈P |
| Egress set | E(p) ⊆ N |
| Ranking metric | m(i,p,e), i,e∈N, p∈P |
| Tunable parameters | α(i,p,e,) and β(i,p,e) |

To support flexible policy while adapting automatically to network changes, the metric m(i, p, e) includes both configurable parameters and values computed directly from a real-time view of the topology. Intra-domain routing topology is represented as an undirected weighted graph G=(N, L), where N is the set of nodes and L is the set of IP links, as summarized in Table I. Based on the link weights, each router i ∈ N can compute the IGP distance d(G, i, e) to every other router e ∈ N. The egress set of possible egress points E(p) ⊆ N consists of the edge nodes that have equally-good BGP routes for destination prefix p. For prefix p, node i selects the egress point $\mathrm{argmin}_e\{m(i, p, e) | e \in E(p)\}$. The metric is computed as a weighted sum of the IGP distance and a constant term:

$$m(i, p, e) = \alpha(i, p, e) \cdot d(G, i, e) + \beta(i, p, e),$$

where α and β are configurable values. The first component of the equation supports automatic adaptation to topology changes, whereas the second represents a static ranking of routes for that destination prefix p. Together, these two parameters can balance the trade-off between adaptivity and robustness. This simple metric satisfies requirements for flexible policies. By tuning the values of α and β, network administrators can cover the entire spectrum of egress-selection policies from hot-potato routing to static rankings of egress points. Hot-potato routing can be implemented by setting $\alpha=1$ and $\beta=0$ for all nodes and prefixes. A static ranking can be represented by setting $\alpha=0$ and, for each node i, $\beta(i, p, e)$ to a constant value for all values of p. Our mechanism can also realize a diverse set of policies in between.

The metric is computationally simple—one multiplication and one addition—based on information readily available to the routers (i.e., the IGP distances and the $\alpha$ and $\beta$ values). This allows routers to compute the appropriate egress point for all destination prefixes immediately after a change in the network topology or egress set. The mechanism offers two knobs ($\alpha$ and $\beta$) that can be easily optimized by a management system based on diverse network objectives. Below, the power of the TIE mechanism is shown to express a wide range of policies, and it is easy to optimize by showing that the optimization problems are tractable.

In addition, when the network-management system changes the $\alpha$ and $\beta$ values, the affected routers can move traffic from one path to another without incurring any convergence delays. This is possible because the network already has forwarding paths between each pair of routers. Changing the $\alpha$ and $\beta$ values merely changes which paths carry the traffic.

For each router i and destination prefix p, network administrators need to configure the values of $\alpha$ and $\beta$. By configuring the egress selection parameters on a per prefix basis, an autonomous system can satisfy diverse policy goals.

In voice-over-IP applications, for instance, suppose that a destination prefix p is used for VoIP and that network administrators set IGP link weights according to propagation delay. Voice applications are sensitive to both high delays and the transient disruptions that occur during egress-point changes. Imagine that the network learns p at two egress points $e_1$ and $e_2$, and that the IGP distance at design time from a router i to each egress is $d(G, i, e_1)=20$ and $d(G, i, e_2)=30$. In the designed topology, i should prefer e1 to forward packets to destination p to minimize delay. If the cost to reach $e_1$ increases a little, i should still use $e_1$ in order to avoid disruptions associated with the egress change.

However, when the IGP distance to $e_1$ exceeds 50, the network administrators want i to select the closest egress.

This application needs an egress-selection policy that is between hot-potato routing and a fixed ranking. At design time, the value of $m(i,p, e_1)=20 \cdot \alpha(i,p, e_1)+\beta(i,p, e_1)$ and $m(i, p, e_2)=30 \cdot \alpha(i, p, e_2)+(\beta(i, p, e_2)$. Since i prefers $e_1$, we need to have $m(i, p, e_1)<m(i, p, e_2)$; however, when $d(G, i, e_1)$ exceeds 50, we need to have $m(i, p, e_1)<m(i, p, e_2)$. We can express these constraints with the following equations:

$$20 \cdot \alpha(i,p, e_1)+\beta(i,p, e_1)<30 \cdot \alpha(i, p, e_2)+(\beta(i, p, e_2)$$

$$50 \cdot \alpha(i,p, e_1)+\beta(i,p, e_1)<30 \cdot \alpha(i, p, e_2)+(\beta(i, p, e_2)$$

$$51 \cdot \alpha(i,p, e_1)+\beta(i,p, e_1)>30 \cdot \alpha(i, p, e_2)+(\beta(i, p, e_2)$$

We can now select the values of $\alpha$ and $\beta$ that satisfy these constraints. For instance, if we set both $\beta(i, p, e_1)=\beta(i, p, e_2)=0$ and $\alpha(i, p, e_1)=1$, then we find that $\alpha(i, p, e_2)=1.7$.

Having considered voice over IP as one application, another potential application is that of performing a large file transfer. Take now the example of two research labs that continuously exchange large data files. Suppose that each research lab has an ISP and that the two providers peer in two locations. Both the source and the destination ISPs need to provision enough bandwidth for these large transfers. To provision for the large file transfers, both ISPs need to know both the ingress and egress points for the data. In this case, the egress selection needs to be stable. The source and destination ISPs agree that e1 should be responsible for carrying this traffic. Then, for each router i we set $\alpha(i, p, e_1)=\alpha(i, p, e_2)=0$ and $\beta(i, p, e_1)=\beta(i,p, e_2)=2$.

The first two examples of voice over IP and a large file transfer consider a prefix in isolation. However, egress-point selection should also consider network-wide goals such as traffic engineering goals. Consider the egress-selection decision for prefixes $p_1$ and $p_2$ at router C in FIG. 2, $p_1$ is a VoIP prefix and $p_2$ corresponds to Web servers. In this example, router C has to choose between egresses A and B. Assume that the path with IGP distance 9 has high capacity, whereas the paths with cost 10 and 11 have lower capacity. When all three paths are working, the network administrators want C to use egress-point B for both prefixes. However, if the path with cost 9 fails, they would like to balance the load over the two lower-bandwidth links. Since the voice traffic to $p_1$ is sensitive to the routing change, the network administrators would prefer to use B for $p_1$ and A for $p_2$. This policy can be implemented by setting the parameters as presented in Table II. C's egress selection to $p_1$ behaves like a fixed ranking of the egress points, whereas $p_2$ behaves like hot-potato routing.

Figure 2:
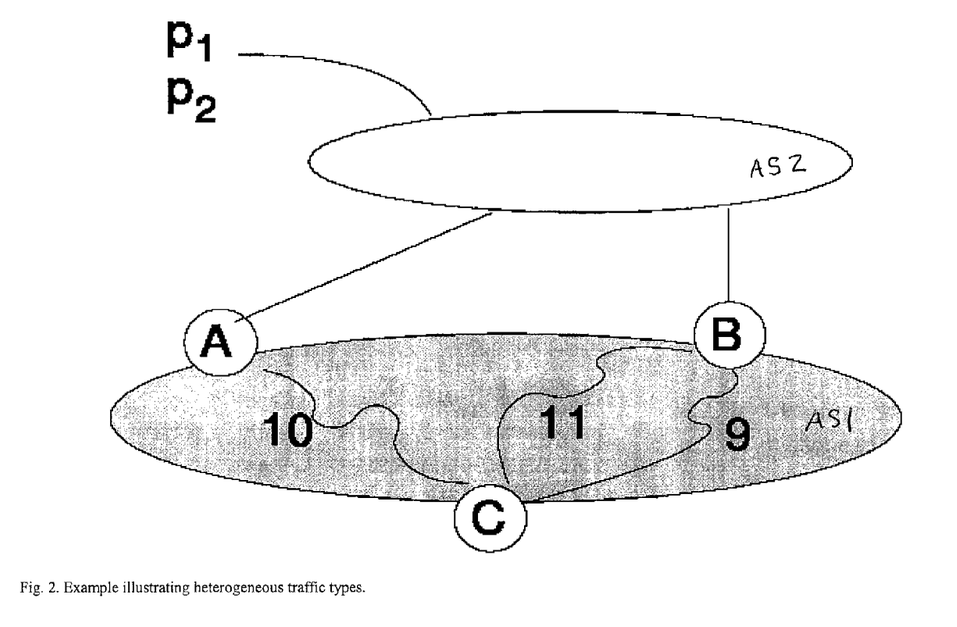
FIG. 2 shows an autonomous system AS1 in further detail to illustrate heterogeneous traffic types and multiple destinations p.

Despite the simplicity of this policy, current egress-selection mechanisms cannot express it. Hot-potato routing would cause both $p_1$ and $p_2$ to shift to egress A after the path with cost 9 fails, and ranking egress B over A for all prefixes would force all traffic over the low-capacity path with cost 11. Of course, after the failure, the network administrators could change the BGP import policy to $p_2$ at A to make it look better than B. However, there is a long delay before they can detect the failure and identify the BGP policy that should be applied in order to alleviate the problem. The preferred embodiment TIE mechanism allow this policy to be implemented at design time, and the network can then adjust itself accordingly.

TABLE II

CONFIGURATION OF PARAMETERS FOR EXAMPLE IN FIG. 2.

|    | α |   | β |   |
|----|---|---|---|---|
|    | A | B | A | B |
| p1 | 0 | 0 | 2 | 1 |
| p2 | 1 | 1 | 0 | 0 |

The setting of $\alpha$ and $\beta$ can be done independently for each pair (i, p), which leads to easier optimization problems. In contrast, tweaking IGP weights impacts the IGP distance between multiple pairs of routers for all routes, and tweaking BGP policies impacts the preference of all routers in the network for a particular route. One potential drawback of the TIE mechanism is the large number of parameters that need to be set at each router. However, below is provided details on how to select suitable values of $\alpha$ and $\beta$ when there are a large number of prefixes involved, and then techniques for reducing the number of parameters that need to be configured in practice are discussed.

Selecting values of $\alpha$ and $\beta$ may minimize the sensitivity of egress-point selection to equipment failures, subject to restrictions on increasing the propagation delay. After presenting a precise formulation of the problem, a preferred method of minimizing sensitivity to failures has two phases—simulating the effects of equipment failures to determine the constraints on the $\alpha$ and $\beta$ values and applying integer-programming techniques to identify optimal settings. The resulting solution uses traffic, topology, and routing data from two backbone networks.

Consider a well-provisioned backbone network that supports interactive applications, such as voice-over-IP and online gaming. The network administrators want to avoid the transient disruptions that would arise when an internal failure causes a change in the egress point for reaching a destination, as long as continuing to use the old egress point would not incur large delays. By setting the IGP link weights according to geographic distance, the shortest IGP path between two nodes would correspond to the smallest delay, and the closest egress point would be the best choice. Hence, for this problem, the best egress point $b(G, i, p)$ for node i and prefix p is the node $e \in E(p)$ with the smallest IGP distance $d(G,i,e)$. If an internal failure occurs, the administrators want node i to continue directing traffic to $b(G, i, p)$ unless the delay to this egress point exceeds $T \cdot d(G, i, b(G, i, p))$ for some threshold $T>1$. If the delay to reach the egress point exceeds the threshold, the administrators want node i to switch to using the (new) closest egress point to minimize the propagation delay. Table III summarizes the notation.

TABLE III

NOTATION FOR THE PROBLEM OF MINIMIZING
SENSITIVITY TO TOPOLOGY CHANGES WITH BOUNDED DELAY.

| | |
|---|---|
| Threshold for tolerable delay | T |
| Set of topology changes | $\Delta G$ |
| Topology change | $\delta \in \Delta G$ |
| Network topology after change | $\delta(G)$ |
| Best egress point for (i,p) on G | $b(G,i,p)$ |

In an ideal world, the routers could be programmed to implement this policy directly. For example, upon each IGP topology change S, each node i could revisit its egress selection for each prefix by performing a simple test for the new topology $\delta(G)$:

if $(d(\delta(G),i,b(G,i,p)) < T \cdot d(G,i,b(G,i,p)))$,
   then $b(\delta(G), i, p) = b(G, i, p)$
     else $b(\delta(G), i, p) = \mathrm{argmin}_e \{d(\delta(G), i, e) | e \in E(p)\}$.

Modifying every router in the network to implement this egress-selection policy would guarantee that the network always behaves according to the specified goal. However, supporting a wide variety of decision rules directly in the routers may be too complicated depending on the application, and ultimately network administrators may want to apply a policy that is not supported in the routers. Generally, as further described below, TIE is expressive enough to implement this policy. Instead of having the routers apply the test in real time, the network-management system configures the TIE parameters at design time based on the policy, and the routers adapt automatically when internal changes occur.

Solving the problem with the TIE mechanism requires us to find values of $\alpha(i, p, e)$ and $\beta(i, p, e)$, for each i, $e \in N$ and $p \in P$, that lead to the desired egress-point selections over all graph transformations $\Delta G$. TIE has two main steps in this scenario. First, a simulation phase determines the desired egress selection both at design time (under graph G) and after each topology change (under graph $\delta(G)$). The output of this phase is a set of constraints on the $\alpha$ and $\beta$ values for each (i, p) pair. Then, an optimization phase determines the values of $\alpha$ and $\beta$ that satisfy these constraints. For this problem, the egress-point selection for each (i, p) pair can be made independently.

Figure 3:
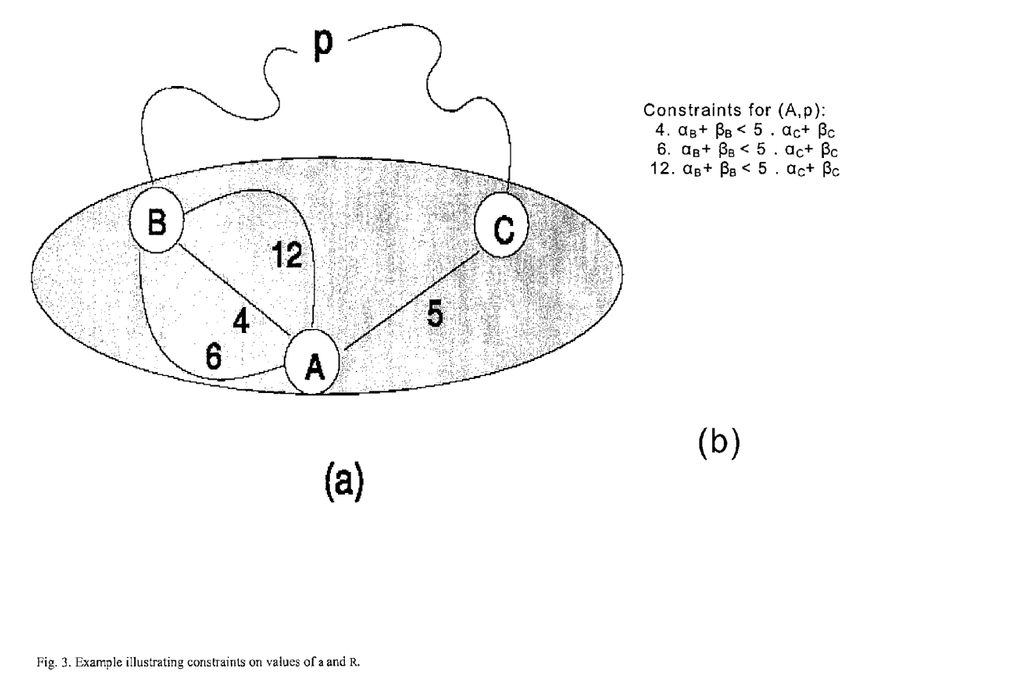

To illustrate how to construct the constraints on $\alpha$ and $\beta$ for the initial topology G and each topology change $\delta$, consider the example shown in FIG. 3(a). In the initial topology, node A would select node B as the egress point because B is closer than C. We can express this by $m(A, p, B) < m(A, p, C)$ for topology G, as shown by the first constraint in FIG. 3(b). Then, we consider each topology change $\delta$ and determine the preferred egress selection with the policy in mind, where T=2 and $\delta_1$ is the failure of the link with cost 4 and $\delta_2$ is the failure of the links with costs 4 and 6. In the new graph $\delta_1(G)$, A is closer to C (with a distance $d(\delta_1(G),A,C)$ of 5) than to B (with a distance $d(\delta_1(G),A,B)$ of 6). However, since $d(\delta_1(G),A,B) < 2 \cdot d(G,A,B)$, A should continue to select egress-point B. This decision is expressed by the second equation in FIG. 3(b). We use the same methodology to evaluate the best egress selection after $\delta_2$. In this case, the distance from A to B is above the threshold, so A should switch to using egress-point C, as expressed by the third equation.

More generally, our algorithm consists of two main steps. First, we compute the distances $d(G,i,e)$ for the original graph G and all transformations $\delta \in \Delta G$ using an all-pairs shortest path algorithm. (For simple graph transformations, such as all single-link failures, an incremental Dijkstra algorithm can reduce the overhead of computing the $|\Delta G|+1$ instances of the all-pairs shortest paths.) Then, we generate the constraints for each (i, p) pair as presented in the algorithm of the simulation phase shown in FIG. 4.

Figure 4:
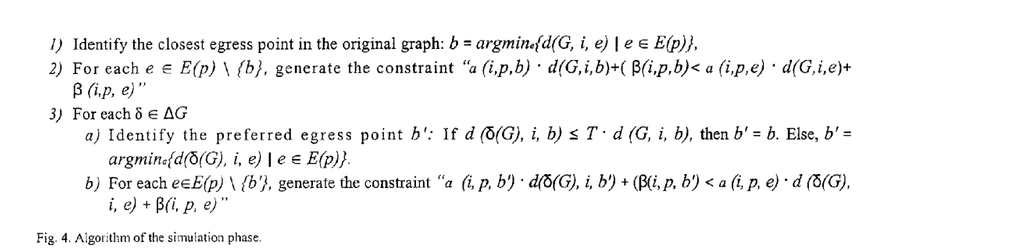
FIG. 4 illustrates an algorithm of a simulation phase for TIE.

Step 2 of FIG. 4 runs once (on the original graph) and step 3 (b) runs $|\Delta G|$ times (on each graph transformation), generating a constraint for each alternative to the desired egress point for that configuration. As a result, the algorithm produces $(|\Delta G|+1) \cdot (|E(p)|-1)$ constraints for each pair (i, p). The size of E(p) is limited by the number of edge nodes that have best BGP routes for a prefix; in practice, the size is usually one, two, or three, or at most ten. Fortunately, any prefixes that have the same egress set produce the same constraints, and the same values of $\alpha$ and $\beta$. The number of unique egress sets is typically orders of magnitude less than the number of prefixes, which substantially reduces the running time of the algorithm. In order to reduce the complexity and number of configurable parameters, we group all routers in the same point of presence (PoP) into a single node; these routers typically make the same BGP routing decisions anyway, since they essentially act as one larger router. Ultimately, the running time of the algorithm is dominated by the number of topology changes in $\Delta G$.

In the optimization phase, we compute $\alpha$ and $\beta$ values that satisfy the constraints for each pair (i, p). In theory, any settings that satisfy the constraints would achieve our optimization goal. However, several practical issues drive how we set up the optimization problem. The first of these is finite-precision parameter values. The $\alpha$ and $\beta$ values should have finite precision to be configured and stored on the routers. Since the parameter values only have meaning relative to each other, we can limit ourselves to considering integer solutions. This leads us to apply integer programming to solve the problem. The second practical issue is limiting the number of unique parameter values. To reduce the overhead of configuring and storing the $\alpha$ and $\beta$ parameters, we prefer solutions that minimize the number of unique values. As such, we attempt to minimize an objective function that is the sum across all of the $\alpha$ and $\beta$ values. The third practical issue is robustness to unplanned events. Although we optimize the parameters based on the topology changes in $\Delta G$, the real network might experience events outside of our model. If optimizing based on $\Delta G$ results in solutions with $\alpha=0$ for an (i, p) pair, then router i would never adapt to a change in IGP distance, however large. To increase the robustness to unplanned events, we add an extra constraint that $\alpha(i, p, e)>0$ for all i, p, and e.

The integer-programming problem for each (i, p) pair was solved using CPLEX, a system described in a User's Manual by S. A. Ilog, published in 2003, with an AMPL interpreter (that may be preferably avoided). Although integer-programming problems are sometimes difficult to solve, the above-described constraints are typically easy to satisfy because many constraints are identical or are subsumed by other constraints. For instance, the second constraint in FIG. 3(b) is stricter than the first constraint (i.e., because $4 \alpha_B < 6 \alpha_B$). In fact, for most of the (i, p) pairs, CPLEX computes the values of α and β during a pre-processing phase that analyzes the constraints. Very few (i, p) pairs required more than three simplex iterations in the root node of the branch-and-bound tree to identify parameters that satisfy the constraints and minimize the objective function. Still, for arbitrary topologies and graph transformations, we could conceivably encounter a scenario where no parameter setting would satisfy every constraint. A scenario like this, should it arise, could be handled by an extension to the integer program to minimize the number of constraints that are violated. This could be achieved by including an extra error term in each constraint and selecting an objective function that minimizes the total error.

We have evaluated the effectiveness of TIE for achieving our goal of minimizing sensitivity to equipment failures on the Abilene network and a tier-1 ISP backbone. We obtain the network topology G and the egress sets {E(p)}. For this problem, we set the IGP link weights to the geographic distance between the PoPs to approximate the propagation delay. We optimize TIE for two sets of topology changes ΔG (single link failures and single node failures) and three different delay thresholds T (1.5, 2, and 3).

Simulation and optimization phases were run on different machines but they may be run on the same machine. It just so happened that our raw measurement data was stored on one machine, and the CPLEX license resided on another, but the present invention should not be limited to such as constraint. The simulation phase, for example, ran on a 900 MHz Ultrasparc-III Copper processor of a Sun Fire 15000. The simulation phase consumed 3.2 MB of RAM and took 0.5 and 31.1 seconds to build the constraints for all pairs (i, p) for the Abilene and ISP networks, respectively. The optimization phase ran on a 196 MHz MIPS R10000 processor on an SGI Challenge. The optimization phase consumed just under 4 MB of RAM and took 37 seconds and 12 minutes to run for the Abilene and ISP networks, respectively. Optimization phase should complete much faster if the CPLEX library is invoked directly from a C program, rather than an AMPL interpreter.

For the Abilene network, α was equal to 1 for 93% of the (i,p,e) tuples and had only four distinct values ($\alpha \in [1,4]$); β was zero for 90% of the (i, p, e) tuples and had only three distinct values ($\beta \in \{0,1,32511\}$). The ISP network has a much larger number of destination prefixes and distinct egress sets, which resulted in a broader range of values for the parameters ($\alpha \in [1,19]$ and $\beta \in \{0,1,3411,4960,5185,5009\}$). However, the vast majority of α values (88%) were equal to one, and 69% of β values were zero. The small number of distinct values for the parameters, and the large number of α(i, p, e)=1 and β(i, p, e)=0, help reduce the overhead of configuring and storing the parameters, as discussed in more detail herein.

After generating the values of α(i, p, e) and β(i, p, e) for each one of these scenarios, we simulate the behavior of each network with this configuration. For comparison, we also simulate the behavior of the network using hot-potato routing (by setting α(i, p, e)=1 and (β(i, p, e)=0 for all (i, p, e)), and the fixed ranking egress selection (by setting α(i, p, e)=0 for all (i, p, e), and β(i, p, e)=d(G, i, b(G, i, p))). We simulate the behavior of these egress-selection policies under the set of all single-link failures and the set of all single-node failures. The results for single-node failures are provided below, the results for the other instances leading to the same conclusions. We compare the three mechanisms using two metrics: namely, delay ratio and routing sensitivity.

With respect to delay ratio, for each (i, p, δ), we compute the delay for i to reach the best egress point for p after the topology change δ(d(δ(G), i,b(δ(G), i, p))), and divide it by the delay to reach the best egress in the original topology (d(G, i, b(G, i, p))). With respect to routing sensitivity, for each (i, δ), the routing sensitivity reprints the fraction of prefixes at i that change egress point after a topology change ι. This metric is the routing-shift function ($H^{RM}$) known from R. Teixeira et al. "Network Sensitivity to Hot Potato Disruptions," 2004 and represents the fraction of a router's BGP table that changes egress points after an intra-domain routing change.

Figure 5:
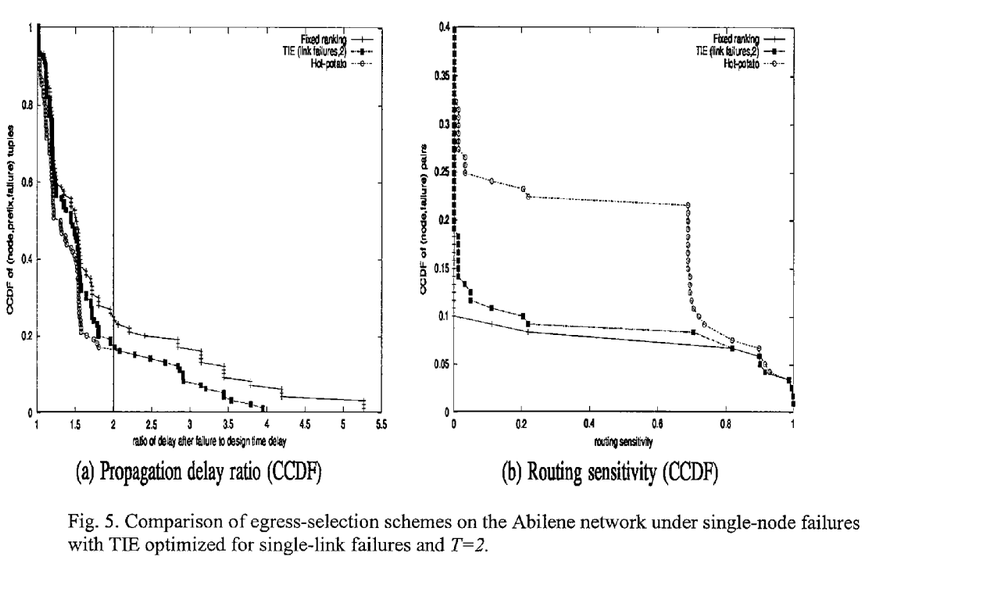
FIG. 5 illustrates a comparison of egress-selection schemes on the Abilene network under singe-node failures with TIE optimized for single-link failures and T=2.

FIG. 5(a) presents the complementary cumulative distribution function (CCDF) of the delay ratio for the Abilene network. A delay ratio equal to one means that the delay after the failure is the same as the delay in the original network. Many of the node failures do not affect the path between an ingress node and a best egress node for a prefix. Therefore, we omit all values that had a delay ratio of one. Given that the link weights are set according to geographic distance, the delay ratio achieved by hot-potato routing represents the smallest feasible delay ratio. Fixed ranking represents the delay to reach the old egress point after the failure. In the plot of FIG. 5(a), we present the results for TIE optimized for single-link failures and T=2, and evaluate the schemes against single-node failures. The results of TIE optimized for single-node failures were very similar (in fact most of the values of α and β were the same).

Despite being optimized for a different set of topology changes, TIE still behaves according to the original goal. TIE exceeds the delay threshold of 2 for only 20% of the (i, p, δ), and hot-potato routing also exceeds the threshold in each of these cases. Fixing the ranking of egress points leads to delays that are higher than the delay achieved by TIE in the majority of instances. Whenever the fixed-ranking scheme lies below the threshold of 2, TIE is below it as well. When the fixed-ranking scheme exceeds the threshold, TIE shifts to an egress point that is at or below the threshold. This is the reason why the TIE curve lies below the fixed-ranking curve for delay ratios under 2.

Below the threshold of 2, TIE has higher delay than hot-potato routing in exchange for lower sensitivity values as shown in FIG. 5(b). This graph plots the CCDF of routing sensitivity for all (i, δ) pairs. Fixing the ranking of egress points has the lowest sensitivity. In fact, the fixed-ranking scheme has a non-zero sensitivity only when the best egress point fails, forcing even this scheme to change to the second-ranked egress point (i.e., the one that was second-closest at the initial topology). The TIE curve follows the fixed ranking for most points. TIE only experiences egress changes when they are unavoidable. The gap between the hot-potato and the TIE curve—around 15% of the (i, δ) pairs—represents the scenarios for which egress-selection disruptions could be avoided without violating the delay threshold.

Figure 6:
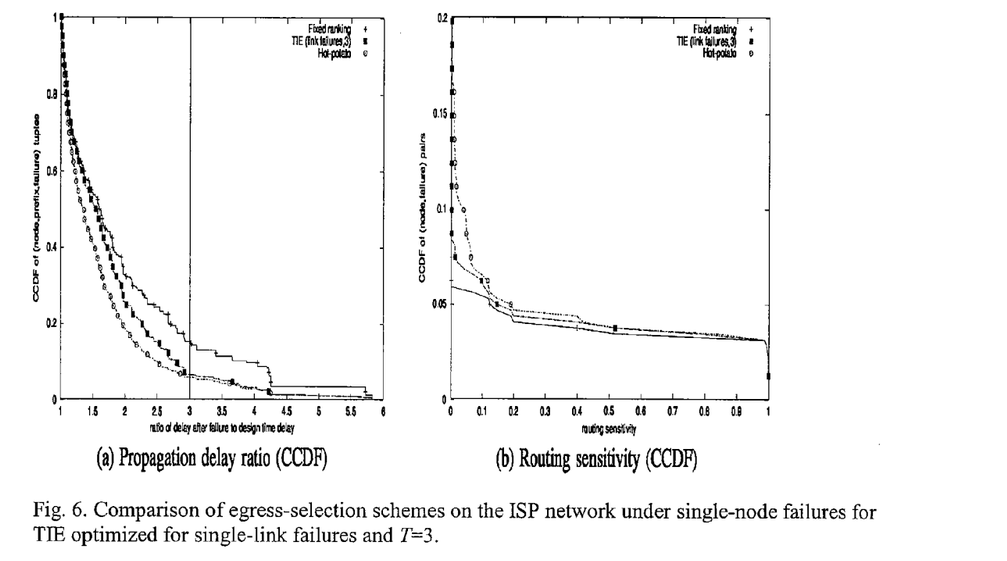

Although similar behavior may be seen in the results for the large ISP network (presented in FIGS. 6(a) and 6(b)), the gap between the curves is not as large as for the Abilene network. In this case, we optimize TIE for single-link failures with a delay threshold T=3. The ISP network has many more choices of egress points per destination prefixes than the Abilene network. Therefore, the delay to reach the closest egress point in the original topology is likely to be very small, and setting the threshold to three times this delay still gives reasonably short delays. This network also has more path diversity than the Abilene network. In a more diverse graph, it is more likely that there is still a low-delay path to the initial egress point, even after the failure. Contrasting the delay ratio and routing sensitivity of the two networks illustrates that there is not a single policy that fits all networks. Compared to the Abilene network, the ISP network could safely put more emphasis on setting the β values, because its rich connectivity makes it unlikely that equipment failures would lead to significant changes in the IGP distance between a pair of routers. The TIE mechanism is flexible enough to accommodate both of these networks.

In this section, we assume that the egress set for each destination prefix is stable when determining the values of α and β. Our evaluation shows that even when an egress node is removed from the egress set, TIE behaves as expected. We can extend the formulation of this problem to find solutions that are robust to egress-set changes. For instance, we can configure TIE to react slowly to the announcement of new routes (i.e., additions to the egress set) by setting the values of α( ,p,e) and β( ,p,e) to be very high for all e ∈ E(p). We can also extend our notion of graph transformations δ to include changes to the egress sets.

Now, we demonstrate the expressiveness of TIE for doing traffic engineering. We propose an optimization problem that balances link utilization on the network only by selecting the appropriate egress point for each pair (i, p) (i.e., by setting the values of (β(i, p, e)). This is in contrast with the common practice of optimizing link utilization by either tweaking IGP link weights or BGP policies. After defining the optimization problem and presenting our solution, we evaluate our solution by comparing the link utilizations achieved using TIE to that using the current network configuration.

Traffic engineering may be defined as adapting the flow of traffic to the prevailing network conditions. Traffic engineering is a common task (that has changed over the years since the days of hard-wired networks). Traffic engineering can be performed in several ways, for example, in the modern IP telephony world. Traffic engineering considers a network topology (G) with the capacity of each link (c($\ell$)), and the traffic demands v(i, p) (i.e., the volume of traffic to destination prefix p that enters the network at ingress router i), as summarized in Table IV. The effects of the IGP weights on the intra-domain paths can be represented by the routing matrix R(i,e,$\ell$), which captures the fraction of traffic from router i to router e that traverses link $\ell$. If the network has one shortest path between i and e, R(i,e,$\ell$) is one for any link $\ell$ on that path, or zero otherwise; if multiple shortest paths exist, R(i,e,$\ell$) may be fractional. The flow of traffic also depends on the egress set E(p) and the egress point b(i,p) that router i uses to reach prefix p.

Traffic engineering involves tuning the network configuration to minimize some function of the load on the links. The load t($\ell$) on link $\ell$ can be determined as follows:

$$t(l) = \sum_{i \in N} \sum_{\substack{p \in P, \\ b(i,p)=e, \\ e \in (p)}} v(i, p) \cdot R(i, e, l)$$

and the resulting link utilization is u($\ell$=t($\ell$)/c($\ell$). The common approach to traffic engineering is to formulate an optimization problem that minimizes an objective function that

TABLE IV

NOTATION FOR THE TRAFFIC-ENGINEERING PROBLEM

Figure 7:
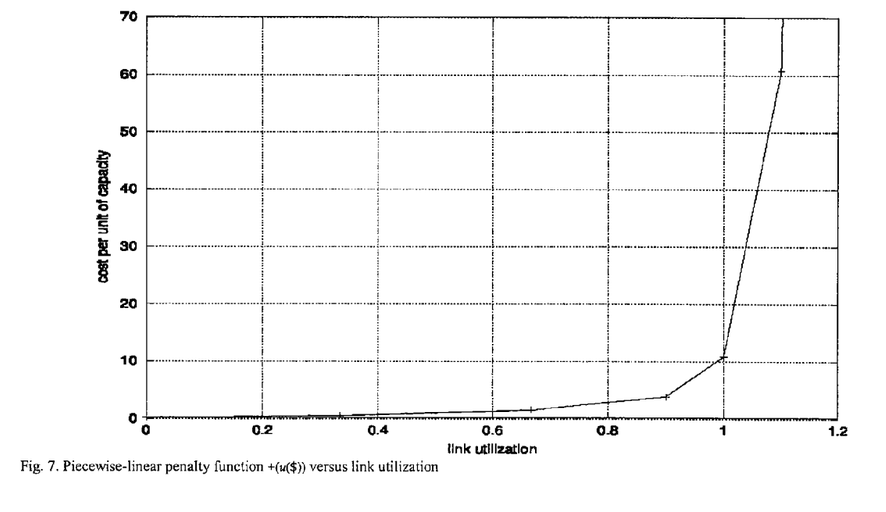
FIG. 7 illustrates a graph of piecewise-linear penalty function $\phi(\mu(\ell))$ or cost per unit of capacity versus link utilization.

| | |
|---|---|
| Link capacity | c{ l), for l ∈ L |
| Traffic demand | v(i,p) for i∈N, p∈P |
| Routing matrix | R{i,e,i), for i,e∈N, l ∈L |
| Egress selection | b(i,p) ∈ E (p) for i∈N, p∈P |
| Link traffic load | t{ l) for l ∈L |
| Link utilization | u{ l) = t{ l)/c{ l), l ∈L |
| Multicommodity flow path | τ(i,e,p) C G |
| Decision variable | x(i,e,p) ∈ {0,1} |
| Link congestion penalty | φ (u(l), l ∈ L |
| Objective function | Φ = Σ$_{l \in L}$ φ(u(l)) | penalizes solutions in terms of the load they place on each link. In our work, we consider the function φ(u($\ell$))in FIG. 7 that increasingly penalizes loads as they near or pass the link's capacity. This piecewise-linear function can be expressed by the known equation $$\phi(u(l)) = \begin{cases} u(l), & u(l) \in [0, 1/3) \\ 3 \cdot u(l) - 2/3 & u(l) \in [1/3, 2/3), \\ 10 \cdot u(l) - 16/3, & u(l) \in [2/3, 9/10), \\ 70 \cdot u(l) - 178/3, & u(l) \in [9/10, 1), \\ 500 \cdot u(l) - 1468/3, & u(l) \in [1, 11/10), \\ 5000 \cdot u(l) - 16318/3, & u(l) \in [11/10, \infty) \end{cases} \quad (1)$$

and used in several other traffic-engineering studies. The network-wide objective function 4) is the sum of the link penalties—i.e., $\Phi = \Sigma_{\ell \in L} \phi(u(\ell))$.

Network administrators can minimize the objective function by changing the intra-domain paths (R(i,e,$\ell$)), inter-domain routes (E(p)), or the egress-point selection (b(i, p)). Tuning the IGP link weights (to influence the intra-domain paths) and the BGP policies (to influence the inter-domain routes) lead to NP-complete optimization problems. The computational intractability of these problems forces the use of local-search techniques that repeatedly evaluate parameter settings in the hope of finding a good solution. Although local-search heuristics often produce good parameter values, the solutions are not optimal and are not guaranteed to have performance that is close to optimal. In addition, the solutions require changing the IGP weights or BGP policies, which triggers routing-protocol convergence and leads to transient disruptions. In contrast, using TIE to control the egress-point selections b(i, p) leads to a simpler optimization problem that does not require changes to the routing-protocol configuration. Since we are simply selecting among existing paths and do not change the configuration of routing protocols, our approach does not trigger routing convergence.

Traffic engineering with TIE involves assigning each (i, p) pair to an egress point b(i, p) ∈ E(p) in a way that minimizes the objective function Φ reproduced above. A solution can be realized by setting (β(i, p,b(i, p)) to a low value, while setting (β(i, p, e) to a high value for all e≠b(i, p), and all α values to zero. In contrast to the fixed-ranking scheme discussed above, a router's ranking of egress points may differ across the prefixes. In practice, we envision solving richer optimization problems that consider robustness to changes in the network topology G, the egress sets E(p), and the traffic demands v(i, p), which would lead to solutions that assign values to both α and β. We focus on fixed topology, egress sets, and traffic demands, to illustrate how TIE provides the flexibility needed to balance load across the links.

We formulate the egress-selection problem as a path-based multi-commodity-flow problem that accounts for the constraints that the routing matrix R(i, e, $\ell$) imposes on the flow of traffic. For a router i and prefix p, we consider the topology τ(i, e, p) induced by the links $\ell \in L$ for which R(i, e, $\ell$)>0. All links in the graph τ(i, e, p) can be used to route traffic from i to p through the egress point e ∈ E(p). We call τ a path in the multi-commodity-flow formulation. We represent the actual routing of the traffic from i to p by a (0,1)-decision variable x(i, e, p), such that x(i, e, p)=1 if and only if the path τ(i, e, p) is selected to send traffic from i to p. The choice of a path τ determines the egress point e ∈ E(p) selected. For all pairs (i, p), the egress-selection problem requires that a single egress point e ∈ E(p) be chosen. We express this requirement by the following equation:

$$\sum_{e \in E(p)} x(i, e, p) = 1.$$

The contribution of the traffic going from i to p to the load on link $\ell$ is the product of the traffic demand v(i, p), the routing-matrix element R(i,e, $\ell$), and the decision variable x(i, e, p). The total load on a link is the sum of all the contributions, i.e.

$$t(l) = \sum_{i \in N} \sum_{p \in P} \sum_{e \in E(p)} v(i, p) \cdot R(i, e, l) \cdot x(i, e, p).$$

A piecewise-linear integer-programming formulation for the single egress-selection problem is to minimize the objective function $\Phi = \sum_{\ell \in L} \phi(u(\ell))$ such that the (0,1)-decision variables x(i, e, p) sum to 1 for each (i, p) pair. Defining $\phi(u(\ell))$ to be a linear variable and applying a standard transformation results in the linear integer-programming formulation:

$$\min \sum_{l \in L} \phi(u(l))$$

s.t.

$$u(l) = \left( \sum_{i \in N} \sum_{p \in P} \sum_{e \in E(p)} v(i, p) \cdot R(i, e, l) \cdot x(i, e, p) \right) / c(l),$$

$$\forall l \in L,$$

$$\sum_{e \in E(p)} x(i, e, p) = 1, \forall l \in N, p \in P,$$

$\phi(u(\ell)) \geq u(\ell), \forall l \in L,$ $\phi(u(\ell)) \geq 3 \cdot u(\ell) - 2/3, \forall l \in L,$ $\phi(u(\ell)) \geq 10 \cdot u(\ell) - 16/3, \forall l \in L$ $\phi(u(\ell)) \geq 70 \cdot u(\ell) - 178/3, \forall l \in L,$ $\phi(u(\ell)) \geq 500 \cdot u(\ell) - 1468/3, \forall l \in L,$ $\phi(u(\ell)) \geq 5000 \cdot u(\ell) - 16318/3, \forall l \in L,$ $x(i, e, p) \in \{0, 1\}, \forall l \in N, p \in P, e \in E(p),$ $\phi(u(\ell)) \geq 0, \forall l \in L.$ However, in general, this integer multi-commodity-flow problem is intractable. Instead, we consider its linear-programming relaxation obtained by relaxing the integrality constraints x(i, e, p) ∈ {0,1} to simply x(i, e, p)≧0. For both networks we consider, the CPLEX solver produced solutions with only integer values of x(i, e, p), allowing us to configure the β(i, p, e) values to pick the single egress point b(i, p) for each (i, p) pair. For situations where the solution of the linear-programming relaxation is fractional, applying a simple heuristic based on randomized rounding can produce a valid egress selection. For each pair (i, p) with fractional x(i, e, p) values, egress point e ∈ E(p) is selected with probability x(i, e, p). Randomized rounding is repeatedly applied and the best solution found is output by the algorithm.

We evaluate the link utilization achieved by TIE on both the Abilene and ISP networks. We obtained the network topology G, the egress sets {E(p)}, and the traffic demands v(i,p). We aggregate all traffic from an ingress i to all destination prefixes p that share the same egress set E(p) to build the ingress to egress set traffic demand v(i,E) for each unique egress set E. For this problem, we use the IGP link weights as configured in each network. The CPLEX solver took only 0.1 and 1.5 seconds to run on the 196 MHz MIPS R10000 processor for the Abilene and ISP networks, respectively. The current network IGP configuration is set to achieve good link utilization assuming that the egress-selection mechanism is hot-potato routing. Therefore, we compare the utilization achieved using TIE with that achieved by hot-potato routing.

Table V presents the value of the objective function φ for both topologies under both egress-selection policies. TIE's flexibility in balancing load allows us to find an optimal solution for both networks using the linear-programming relaxation. The solution using hot-potato routing is 40% worse than that found using TIE for the ISP network. Hot-potato routing has a congestion function close to TIE for the Abilene network. However, even though the Abilene network is significantly under-utilized, TIE does offer some (admittedly modest) improvements to the objective function.

TABLE V

COMPARISON OF THE NETWORK CONGESTION FUNCTION φ BETWEEN HOT-POTATO ROUTING AND TIE

|  | Abilene Network | ISP Network |
| --- | --- | --- |
| Hot-potato routing | 0.4513510071 | 8.990353677 |
| TIE | 0.4425879808 | 5.557480707 |

Figure 8:
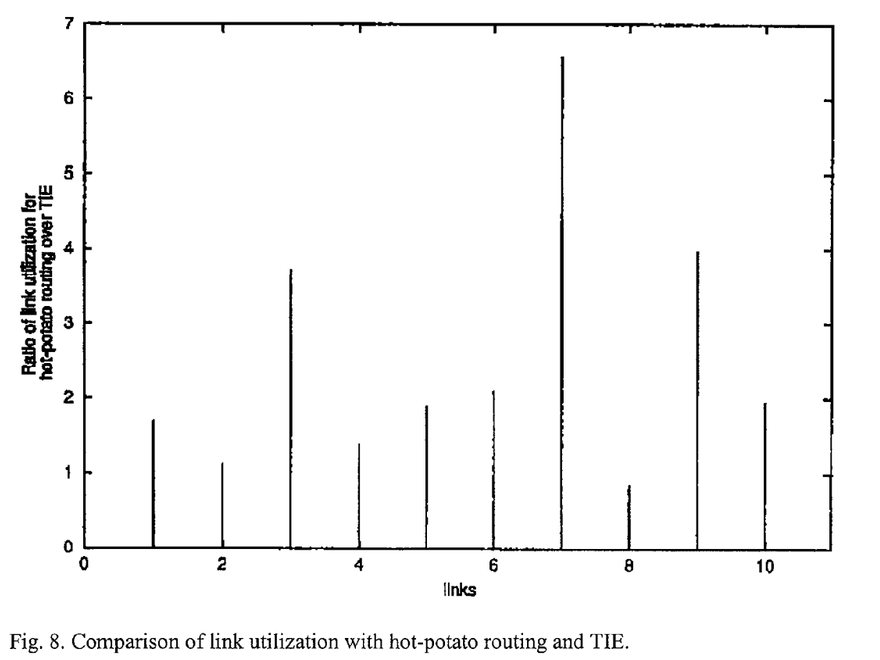
FIG. 8 illustrates a chart comparing link utilization with hot-potato routing and with the preferred embodiment, TIE.

FIG. 8 shows the ratio of link utilization between hot-potato routing and TIE, for the ten most heavily-loaded links under hot-potato routing; link number 1 is the most utilized link and number 10 is the tenth most utilized. The TIE solution reduces the utilization of the most utilized link by 40.9%. Although TIE increases the load on some links (as illustrated by link 8 in FIG. 8), our solution reduces the utilization of two-thirds of the links, and the most utilized link in the TIE solution has 26.3% less utilization than the most utilized link under hot-potato routing.

A comparison of the TIE solution with the loose lower bound achieved by multi-commodity flow with no restrictions on using valid IGP paths may be useful. We also will compare this solution with that achieved by using other traffic-engineering mechanisms: (i) heuristics for IGP link-weight optimization; (ii) heuristics for setting local-preference values in BGP import policies; and (iii) egress-point optimization where each router i is forced to have a single ranking of egress points across all destination prefixes, as in Section II-B. These comparisons will help us understand how much of the performance benefit of TIE comes from the decoupling of egress selection from the IGP weights versus the ability to exert fine-grain control over the ranking of egress points.

Now, we assume that each router i can select any $e \in E(p)$ for each destination prefix p. However, this assumption could conceivably lead to long propagation delays if i selects a far-away egress point, or to unnecessary BGP update messages to neighboring domains. These concerns may be simply addressed by removing certain egress points from consideration if they have high propagation delay or a BGP route with a different AS path. For instance, egresses where d (G, i, e) exceeds a threshold could be removed from consideration for router i, or we could consider only the egress points that have BGP routes with the same autonomous system path. Our solution can also treat destination prefixes for sensitive applications (such as VoIP) separately. For instance, the egress selection for such prefixes can be done to minimize sensitivity and delay as discussed above, and the demands to these prefixes considered as immutable background load for the traffic-engineering problem.

The traffic-engineering optimization problem as defined in this section only considers the utilization of internal links. A natural extension is to use TIE to balance outbound load on the edge links. We can formulate this problem by adding an artificial node for each destination prefix p, with each peering link connecting to it, and solve it using the same methodology presented here. In addition, our traffic-engineering optimization problem currently may not set the values of $\alpha$. This prevents the egress selection to automatically adapt to changes in the network topology. We can combine our methodology for solving the problem presented above with the one presented here to find a solution to the robust traffic-engineering problem. In steps 1 and 3(a) from FIG. 4, instead of identifying the best egress point according to the shortest distance, we can achieve robust traffic engineering by selecting the best egress according to the solution of the path-based multi-commodity-flow problem. TIE can also be configured, for example, before planned maintenance activities to ensure low link utilizations during the event. In this case, the topology change δ is known in advance, so the network administrators can compute the optimal egress selection in the modified topology δ(G) and adjust $\alpha$ and $\beta$ to achieve the desired traffic-engineering goal.

An autonomous system can deploy the TIE mechanism without changing the intra-domain or inter-domain routing protocols, and without the cooperation of other domains. Now, we first describe how to ensure that each router can apply TIE independently of other routers in the autonomous system. Next we discuss how to configure the $\alpha$ and $\beta$ parameters and how a router applies the TIE mechanism to select a BGP route for each destination prefix. Then, we discuss how moving the responsibility for BGP path selection from the routers to separate servers would make it possible to implement our TIE scheme without any modification to the decision logic running on the routers.

Throughout, we have assumed that each node applies the TIE mechanism to select a single best route from the set of equally-good BGP routes chosen by the border routers. In a network with a "full mesh" internal BGP (iBGP) configuration, each router learns these routes directly from the border routers. However, large networks typically employ route reflectors to overcome the scaling problems of having an iBGP session for each pair of routers. A route reflector runs the BGP decision process and propagates a single best route to its clients; as a result, the clients may choose a different best route than they would with all of the options at their disposal. The way route reflectors affect the BGP decisions of their clients leads to a variety of operational problems, such as protocol oscillation and forwarding loops. An appealing way to avoid these problems, while retaining most of the scalability advantages, is to have the route reflectors forward all of the equally-good BGP routes to their clients. This enhancement to route reflectors would allow each router in the AS to apply the TIE mechanism based on a complete view of the egress set for each destination prefix. In a network with route reflectors, we recommend applying the TIE mechanism only on the route reflectors to allow decisions based on a complete view of the BGP routes. The client routers (e.g., other routers in the same PoP) would inherit the choice made by their common route reflector. This has the added advantage that only the route reflectors would need to be upgraded to implement the TIE mechanism.

The TIE mechanism also relies on the underlying network to forward data packets from the ingress router to the chosen egress point. However, the routers along the forwarding path do not necessarily select the same egress point, depending on how their $\alpha$ and $\beta$ parameters are configured. This problem does not arise in hot-potato routing because each router selects the closest egress point, which ensures that the routers along the shortest path have chosen the same egress point. Rather than constraining the way $\alpha$ and $\beta$ are set on different routers, the network may employ some form of lightweight tunneling to direct traffic over the shortest IGP path(s) from the ingress point to the egress point. For example, the ingress router could encapsulate each data packet in an IP packet where the destination corresponds to the chosen egress router. Alternatively, the network may employ known multi-protocol label switching (MPLS) techniques to create label-switched paths (LSPs) between all ingress-egress pairs, as discussed above. Tunneling IP packets over the underlying IGP paths is a common usage of MPLS since it obviates the need for interior routers to speak BGP or have a large forwarding table, while also allowing the network to forward virtual private network (VPN) and non-IP traffic.

Using the TIE mechanism requires configuring the routers with the values of $\alpha$ and $\beta$ selected by the optimization routine. Rather than configuring these values by hand, we envision that a network-management system would connect to each router to set or modify the parameters. Still, configuring a large number of values may introduce significant overhead and delay. In the worst case, each router would need to be configured with two integer values for every destination prefix and edge router. For a network with 500 edge routers and 150,000 destination prefixes, this would require configuring 75 billion parameters (i.e., 500·500·2·150, 000), which is clearly excessive. Fortunately, a router often has the same values of $\alpha$ and $\beta$ across many destination prefixes and egress points. To capitalize on this observation, the TIE mechanism could have default values of $\alpha=1$ and $\beta=0$ (corresponding to hot-potato routing) for each prefix, allowing the management system to specify only the parameters that differ from these values. For example, above in the sensitivity minimization discussion, only 10% of the $\beta$ values were nonzero for the tier-1 ISP backbone, which would reduce the configuration overhead by an order of magnitude.

Another way to reduce the overhead is to assign $\alpha$ and $\beta$ at a coarser granularity than individual routers and destination prefixes. For example, the parameters could be defined for PoPs, rather than routers, particularly if TIE is implemented only at the route reflector(s) in each PoP. If the 500-router network has, for example, 25 PoPs, the number of parameters would drop by a factor of 400 (i.e., 25 PoPs would be configured with two parameters per prefix for 25 egress PoPs). In addition, the parameters could be based on the destination AS (i.e., the origin AS that initially announced the BGP route), rather than the destination prefix. If the Internet has, for example, 20,000 autonomous systems and 150,000 prefixes, this would reduce the number of parameters by an additional factor of 7.5. Together, these two optimizations would reduce the number of parameters by a factor of 3000, from 75 billion down to 25 million across all the routers in the network, which seems acceptable particularly if the management system need only specify exceptions to the default $\alpha$ and $\beta$ values. Further reductions can be achieved by associating $\alpha$ and $\beta$ values with the next-hop autonomous system (AS) or other route attributes.

When $\alpha$ and $\beta$ are not associated directly with particular prefixes and egress routers, the ingress router needs some way to know which parameters to use in selecting a BGP route for a prefix. The BGP community attribute provides an effective way to communicate which parameters should be used. For example, the border routers could be configured to tag each BGP advertisement with a unique community value that identifies the PoP. Another community could be used to identify the origin AS or next-hop AS associated with the advertisement. Upon receiving these tagged routes via internal BGP (iBGP), a router can use these community values to index into a table that stores the $\alpha$ and $\beta$ values. Using BGP communities in this way is quite common. For example, policy-based accounting uses community attributes to determine which prefixes should have their traffic measured together by a single counter.

Once the router knows which $\alpha$ and $\beta$ values to use, the router can compute the metric m based on these parameters and the IGP distance to the egress router. Rather than applying the traditional IGP tie-breaking step, the router can implement a modified BGP decision process that uses the m metric to select the route with the most-preferred egress point. Ultimately, the TIE mechanism requires only a change in one step of the BGP decision process implemented on the routers, rather than any protocol modifications. Router vendors may already provide features that allow network administrators to modify the operation of the BGP decision process, which significantly reduces the barrier to deploying TIE.

TIE may be applied in a separate path-selection platform. Rather than modifying the BGP decision process implemented on the routers, an autonomous system may move the entire responsibility for BGP path selection to a separate software platform. In this setting, dedicated servers receive the external BGP advertisements and run decision logic to select BGP routes on behalf of the routers in the autonomous system. The servers use internal BGP sessions to send each router a customized routing decision for each prefix, essentially overriding the influence of the BGP decision process running on the routers.

These servers may implement the TIE mechanism for selecting the routes in real time, and might also run the offline optimization routines that set the $\alpha$ and $\beta$ parameters. This would allow the parameters to exist only on the servers, rather than in the routers or other management systems. Even though the servers could conceivably implement any decision logic, in practice they need some separation of functionality between the real-time adaptation to network events and the longer-term optimization of the path-selection process based on network-wide goals. TIE provides a way to achieve that separation.

Measurement studies have shown that hot-potato routing changes can lead to long convergence delays, large shifts in traffic, and external BGP routing changes. It is known to propose metrics of network sensitivity to internal changes to assist network administrators in minimizing hot-potato disruptions. Rather than trying control disruptions using routing protocols as they are defined today, TIE may redesign the boundary between the two tiers of the routing system to achieve a broader set of traffic-engineering goals (including minimizing disruptions).

Research by others on traffic engineering has shown how to tune the configuration of IGP link weights and BGP policies to the prevailing traffic. However, the resulting optimization problems are NP complete, forcing the use of local-search techniques. Finding a good setting of the configurable parameters is especially difficult when routing must be robust to equipment failures. Instead, TIE has been designed with optimization in mind, allowing the direct application of effective techniques such as integer programming and multi-commodity flow.

TIE optimizes egress point selection. Previous research considered an optimization problem similar to the one studied above in the traffic engineering discussion. Others have focused on selecting egress points such that traffic loads do not exceed the egress-point capacities, with the secondary objective of minimizing the total distance traveled by the traffic. In contrast, we formulate an optimization problem that minimizes congestion over the links in the network, using the objective function used in earlier traffic-engineering studies.

TIE considers multi-homing. In recent years, an increasing number of stub autonomous systems, such as large enterprise and campus networks, connect to multiple upstream providers for improved reliability and flexibility. In response, several research studies have previously considered how these networks should balance load over the multiple access links. However, TIE solves a different problem because we focus on networks where each destination prefix has a (possibly different) set of egress points, and the choice of egress point affects the load on links inside the autonomous system.

TIE also considers inter-autonomous system negotiation. Others have considered how a pair of neighboring autonomous systems could coordinate to select egress points in a mutually advantageous manner. Where these others focus on the negotiation process, and on the important question of what information the autonomous systems should exchange, TIE is a tunable mechanism for selecting the egress points and a way for each AS to determine its preferred egress points based on network-wide objectives.

IP networks are under increasing pressure to provide predictable communication performance for applications such as voice over IP, interactive gaming, and commercial transactions. These exemplary applications are sensitive to both transient disruptions (i.e., during routing changes) and persistent congestion (i.e., when the routing does not match the prevailing traffic). TIE is a new mechanism for selecting egress points that satisfies both requirements. TIE avoids the disruptions caused by hot-potato routing changes while supporting diverse network-wide objectives such as traffic engineering and maintenance planning.

TIE is simple enough for routers to adapt in real time to network events, and yet is much more amenable to optimization than today's routing protocols. In addition, TIE can be deployed in an autonomous system without changing the intra-domain or inter-domain routing protocols, and without the need for cooperation among other domains. Our experiments for two network-management problems, using data from two backbone networks, demonstrate the effectiveness of TIE and the ease of applying conventional optimization techniques to determine the best settings for the tunable parameters. These and other features other the present invention will be appreciated from the above description, the following brief appendix describing out methodology and the claims which follow. Network administrators may apply TIE in alternative network applications and in varying environments without departing from the spirit of the present invention.

Above, TIE was evaluated on data from two operational networks. In this brief appendix, we present our methodology for obtaining the input data—the internal topology, the egress sets, and the traffic demands—from passive measurements. Since routers in the same Point-of-Presence (PoP) essentially act as one larger node, we model the topology of both networks at the PoP level.

Abilene is the backbone for U.S. research network. The network has 11 PoPs with one router each. The vast majority of the links are OC192, with only one OC48. For TIE, we used available data from one month in the spring. We obtained the topology G at that time (both with designed weights and geographic distance) and link capacities c(l) from the publicly-available map of the network. This map provided the location of each router, as well as the link capacities and IGP weights.

Each BGP speaker has around 7,500 prefixes in its routing table. We obtained the egress set E(p) for each prefix from a dump of the BGP table for a monitor that peers with every router. The network had only 23 distinct egress sets.

We extracted the traffic demands from sampled Netflow data. Every router in the network has Netflow enabled with a sampling rate of 1/100. For each router i and destination prefix p we have set v(i, p) to the average traffic volume for one hour of Netflow data collected on a weekday afternoon.

We also used data collected from a tier-1 service-provider backbone in a winter month. We extracted the router-level topology and IGP link weights from the link-state advertisements logged by a routing monitor. We used router configuration data to map each router to a PoP and determine the link capacities. The resulting topology has a few dozen nodes. For simplicity, we combined parallel links between a pair of PoPs into one link with the aggregate capacity. We also used the PoP locations to determine the geographic distance traversed by each inter-PoP link.

The network learns BGP routes for approximately 150,000 prefixes. We built the egress set E(p) for each prefix from the BGP table dumps from all top-level route reflectors in the network. The network has a few hundred distinct egress sets.

We used sampled Netflow data collected around the entire periphery of the network. We aggregated all traffic entering at the same PoP i and destined to the same prefix p into a single traffic demand v(i, p). Each traffic demand represents the average traffic rate over the course of the day.

Thus there has been described a tunable method of selection of points of egress from an autonomous system utilizing a metric comprising a variable term based on an internal gateway protocol (IGP) distance and a constant among other variations thereof. The method may be further utilized in an autonomous system for traffic engineering and load minimization purposes and should only be deemed to be limited by the scope of the claims which follow.

We claim:

1. A method for use at a router at a point of ingress to an autonomous system of selecting a point of egress from the autonomous system toward a destination comprising:

identifying a plurality of points of egress from the autonomous system;
ranking the plurality of points of egress according to a metric having variable and fixed terms;
selecting a point of egress having the smallest rank; and
transmitting packets from a point of ingress via a path to the selected point of egress,
wherein the metric is across a plurality of destinations and respective possible points of egress from the autonomous system and the metric is m(i, p, e) equaling $\alpha$(i, p, e)·d(G,i,e)+$\beta$(i, p, e) where $\alpha$ and $\beta$ are configurable values, i is the identity of the router, p is the destination, G is an undirected weighted graph, the d function is the interior gateway protocol distance and e is a point of egress.

2. A method as recited in claim 1, the metric comprising a weighted sum of an interior gateway protocol distance and a constant.

3. A method as recited in claim 1 further comprising the step of minimizing packet propagation delay in a given autonomous system.

4. A method as recited in claim 1 further comprising the step of utilizing integer-programming techniques.

5. A method as recited in claim 1 further comprising the step of utilizing multi-commodity-flow techniques.

6. A method as recited in claim 5, the autonomous system providing one of voice over IP, on-line gaming and business applications.

7. A method as recited in claim 3 further comprising the step of selecting a delay threshold from 1.5, 2 and 3 depending on a network topology.

8. A method as recited in claim 1, said method of selecting a point of egress including the steps of weighting a hot potato selection of a point of egress and determining a fixed ranking of possible points of egress.

9. A network method for use at a router at a point of ingress to an autonomous system of selecting a point of egress from the autonomous system comprising:

a) identifying a plurality of possible points of egress for a point of ingress;
b) establishing a tunnel from the point of ingress to a possible egress router;
c) assigning an interior gateway protocol metric to the tunnel; and
d) sending a data packet from the ingress router to a possible egress router according to the shortest metric,
wherein the metric is across a plurality of destinations and respective possible points of egress from the autonomous system and the metric is m(i, p, e) equaling $\alpha$(i, p, e)·d(G,i,e)+$\beta$(i, p, e) where $\alpha$ and $\beta$ are configurable values, i, is the identity of the router, p is the destination, G is an undirected weighted graph, the d function is the interior gateway protocol distance and e is a point of egress.

10. A method as recited in claim 9, the metric comprising a weighted sum of an interior gateway protocol distance and a constant.

11. A method as recited in claim 9, further comprising the steps of weighting a hot potato selection of a point of egress and weighting a fixed ranking of possible points of egress.

* * * * *